UNITED STATES PATENT OFFICE.

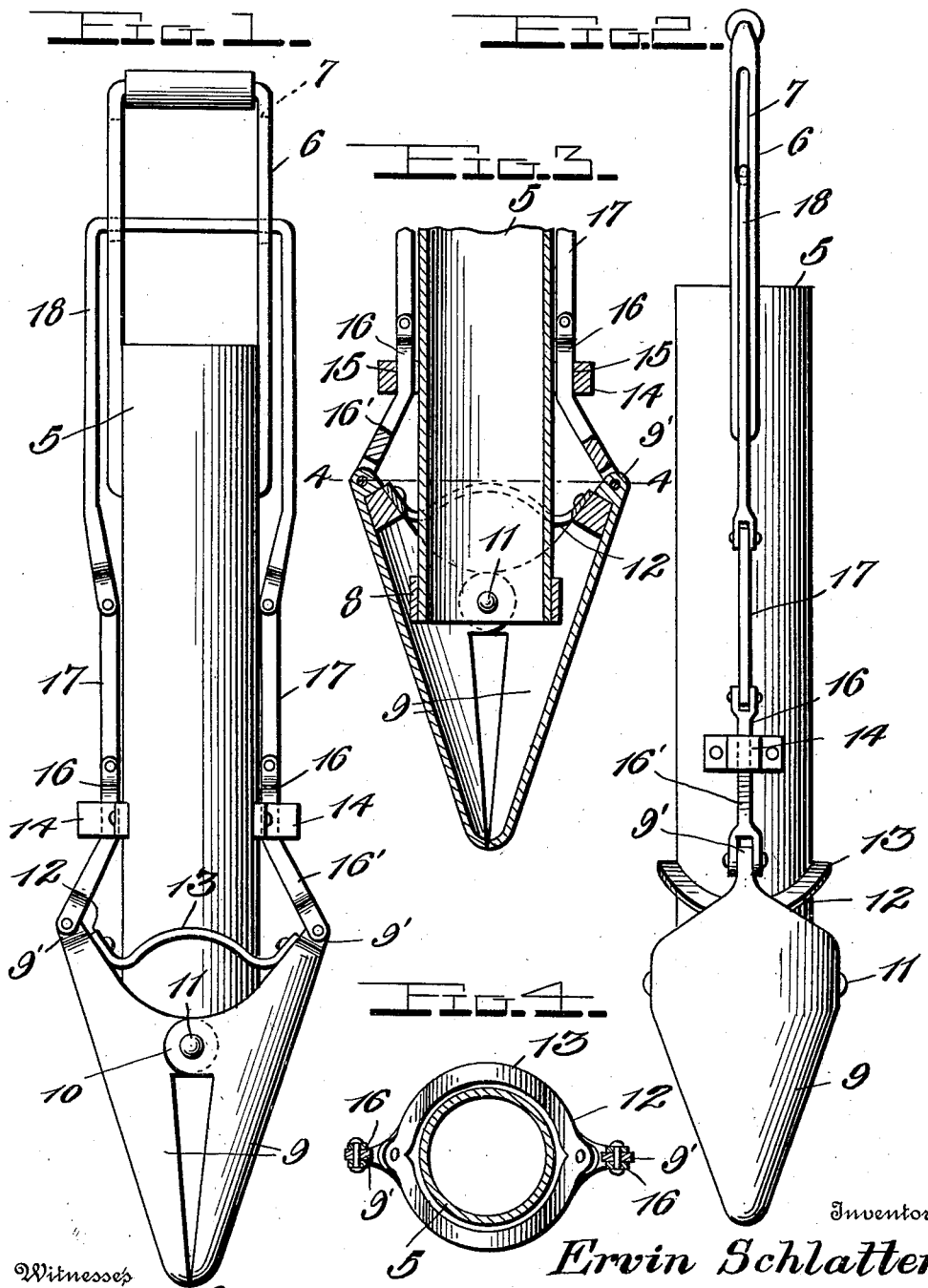

ERVIN SCHLATTER, OF HARMONY, INDIANA.

TRANSPLANTER.

1,007,241.  Specification of Letters Patent.  Patented Oct. 31, 1911.

Application filed June 21, 1911. Serial No. 634,462.

*To all whom it may concern:*

Be it known that I, ERVIN SCHLATTER, a citizen of the United States, residing at Harmony, in the county of Clay and State of Indiana, have invented certain new and useful Improvements in Transplanters, of which the following is a specification, reference being had to the accompanying drawings.

This invention relates to transplanters and has for its object to provide a very simple, efficient and durable device of this character which may be easily and quickly manipulated to deposit the plants in the earth.

Another object of the invention resides in the provision of a plant receiving tube having a pair of ground opening shoes pivotally mounted upon its lower end, means yieldingly holding the shoes closed, and additional means mounted upon the tube and connected to said shoes to open the same and release the plant.

With the above and other objects in view, the invention consists of the novel features of construction, combination and arrangement of parts hereinafter fully described and claimed, and illustrated in the accompanying drawings, in which—

Figure 1 is a side elevation of a transplanter embodying my improvements; Fig. 2 is an elevation looking at right angles to Fig. 1; Fig. 3 is an enlarged section of the lower end of the transplanter; and Fig. 4 is a section taken on the line 4—4 of Fig. 3.

Referring in detail to the drawing 5 designates a cylindrical plant receiving tube which is preferably constructed from sheet metal. To the upper end of this tube and at diametrically opposite points, the ends of an elongated U-shaped handle or bail 6 are rigidly attached. The parallel side bars or arms of this handle are of rectangular form in cross section and are each provided with a longitudinal slot 7 for a purpose which will hereinafter appear.

The lower end of the plant receiving tube 5 is provided with an annular reinforcement 8 upon which on opposite sides of tube the ground opening shoes 9 are pivotally mounted, each of said shoes being provided with the laterally extending ears 10 through which the pivot pins 11 fixed in the lower end of the tube 5 extend. The shoes 9 are of substantially concavo-convex form in cross section and extend above the pivots 11, the upper ends 9' of said shoes being normally spaced from the periphery of the tube 5. The lower ends of the tubes are tapered and meet to form a piercing point which is adapted to be forced into the soil to provide an opening to receive the plant. The shoes 9 are yieldingly held in their normal closed positions by means of the spring plate 12 which surrounds the tube 5 and is bowed upon opposite sides thereof as indicated at 13, the ends of said spring plate being rigidly secured to the upper ends of the shoes.

Lugs 14 are riveted or otherwise secured to the tube 5 upon opposite sides thereof and above the shoes 9. These lugs are provided with recesses 15 in their inner ends in which the link bars 16 are movably disposed. The lower ends of these link bars are pivotally connected to the upper ends 9' of the shoes 9, said links below the lugs 14 being disposed outwardly at an obtuse angle as indicated at 16', with relation to the upper portions thereof which extend in parallel relation to the wall of the tube 5 and lie in close proximity thereto. To the upper ends of the link bars 16, a pair of links 17 are pivotally connected, the other ends of said links being pivoted to the lower ends of a vertically disposed U-shaped rod 18. The parallel portions of this rod are disposed in spaced relation to the outer face of the parallel bars of the handle 6, and the intermediate horizontal portion of the rod 18 is movably disposed in the longitudinal slots 7 of the handle. The ends of the rod 18 are inwardly bent or curved and disposed contiguous to the periphery of the tube 5 so that the links 17 which are connected thereto are normally disposed in parallel relation to said tube.

When it is desired to deposit a plant from the tube 5 into the soil, the operator grasps the handle 6 and engages the horizontal portion of the rod 18 with the fingers, and upon an upward pull thereon, the lower links 16 will be drawn through the lugs 14, and the movement of the inclined portion 16' thereof between the recesses of said lugs and the sides of the tubes acts to force the lower ends of the plant holding shoes apart to release the plant disposed between the same. It is of course, understood, that the lower ends of the shoes 9 are first forced into the ground to the proper depth before the same are opened. In the opening movement of the shoes, the bowed portions 13 of the spring plate 12 are placed under tension, whereby, when the operator releases the rod 18, said spring plate will assume its natural form and return the shoes 9 to their normal closed positions. Another plant may now be inserted into the tube 5 and the same operation repeated.

From the foregoing it is thought that the construction and operation of my improved transplanter will be readily understood.

The implement consists of very few parts which are all of simple form and extremely durable so that the same are not liable to derangement and will withstand the hard usage to which devices of this character are frequently subjected. The device may be very rapidly manipulated so that the plants may be easily and quickly transplanted and properly deposited in the soil.

While I have shown and described the preferred construction and arrangement of the various parts, it will be understood that the device is susceptible of considerable modification without departing from the essential feature or sacrificing any of the advantages thereof.

Having thus described the invention what is claimed is:—

1. A transplanter comprising a plant receiving tube, opposed ground opening shoes pivotally mounted upon the lower end of said tube, a spring plate surrounding said tube and secured at its ends to said shoes, said spring plate normally holding the shoes closed, guides arranged upon the tube, and means connected to the upper ends of the shoes and movable in said guides to open said shoes and release a plant carried thereby.

2. A transplanter comprising a plant receiving tube, opposed ground opening shoes pivotally mounted upon the lower end of the tube, means connecting said shoes and yieldingly holding the same closed, a handle secured to the upper end of the tube including spaced parallel bars, each of said bars having a longitudinal slot therein, a U-shaped rod having its intermediate portion disposed through said slots and longitudinally movable therein, movable connections between the ends of said rod and the shoes, and means arranged upon the tube co-acting with said movable connections whereby said shoes are opened in the longitudinal movement of the rod.

3. A transplanter comprising a plant receiving tube, opposed ground opening shoes pivotally mounted upon the lower end of the tube, means yieldingly holding the shoes closed, a U-shaped rod longitudinally movable with relation to the tube, a guide therefor, lugs fixed to said tube at opposite points and having recesses therein, and link connections between said shoes and the end of said U-shaped rod movable through the recesses of the lugs to open said shoes in the longitudinal movement of the rod.

4. A transplanter comprising a plant receiving tube, opposed ground opening shoes pivotally mounted upon the lower end of the tube, means yieldingly holding the shoes closed, a longitudinally movable actuating member, guide means therefor mounted on the tube, lugs secured to said tube at opposite points and having recesses therein, link bars pivotally connected to the upper ends of the shoes and extending through the recesses of the lugs, said link bars below the lugs being outwardly disposed at an obtuse angle, and connecting links between the upper ends of said link bars and said actuating member whereby the shoes are opened in the longitudinal movement of said member.

In testimony whereof I hereunto affix my signature in the presence of two witnesses.

ERVIN SCHLATTER.

Witnesses:
   GEO. ROBIG,
   PHILIP RAAB.